United States Patent
Basir et al.

(10) Patent No.: US 9,481,373 B2
(45) Date of Patent: Nov. 1, 2016

(54) BEHAVIOR BASED DRIVING RECORD MANAGEMENT AND REHABILITATION

(71) Applicant: IMS SOLUTIONS, INC., Schaumburg, IL (US)

(72) Inventors: Otman A Basir, Waterloo (CA); William Ben Miners, Guelph (CA); Shunkar Manoharan, Pickering (CA)

(73) Assignee: IMS SOLUTIONS, INC., Schaumburg (IL)

(*) Notice: Subject to any disclaimer, the term of this patent is extended or adjusted under 35 U.S.C. 154(b) by 0 days.

(21) Appl. No.: 14/514,330

(22) Filed: Oct. 14, 2014

(65) Prior Publication Data

US 2015/0106289 A1    Apr. 16, 2015

Related U.S. Application Data

(60) Provisional application No. 61/890,492, filed on Oct. 14, 2013.

(51) Int. Cl.
| | |
|---|---|
| *G07C 5/08* | (2006.01) |
| *B60R 25/102* | (2013.01) |
| *B60W 40/09* | (2012.01) |
| *G06Q 50/26* | (2012.01) |
| *G07C 5/00* | (2006.01) |

(52) U.S. Cl.
CPC ............ *B60W 40/09* (2013.01); *G06Q 50/265* (2013.01); *G07C 5/008* (2013.01); *G07C 5/08* (2013.01); *B60K 2350/1076* (2013.01); *B60W 2540/28* (2013.01); *B60W 2540/30* (2013.01)

(58) Field of Classification Search
CPC .. G07C 5/08; G06Q 50/265; G06Q 10/0639; B60W 40/09; G05Q 10/0639; G09B 19/167; B60R 25/102; G01S 19/14; A63F 3/00088

USPC .......... 705/4, 325; 434/65; 273/252; 702/33; 701/408, 31.4
See application file for complete search history.

(56) References Cited

U.S. PATENT DOCUMENTS

| | | | |
|---|---|---|---|
| 6,714,894 B1 | 3/2004 | Tobey et al. | |
| 8,311,858 B2 | 11/2012 | Everett et al. | |
| 8,417,415 B2 | 4/2013 | Phelan | |
| 8,506,302 B2 | 8/2013 | Voorhees et al. | |
| 8,554,468 B1 * | 10/2013 | Bullock .................. | G01S 19/14 340/438 |

(Continued)

FOREIGN PATENT DOCUMENTS

WO    2008144576    11/2008

OTHER PUBLICATIONS

International Search Report and Written Opinion for PCT Application No. PCT/US2014/060536, mailed Feb. 2, 2015.

*Primary Examiner* — Yuri Kan
(74) *Attorney, Agent, or Firm* — Carlson, Gaskey & Olds, P.C.

(57) ABSTRACT

The behavior-based driving record management program is designed to assist drivers that have received driving penalties or "demerit points" to improve their behavior and "rehabilitate" to recover their driving privileges. Telematics are used to monitor the driving behavior over time and provide feedback to the driver. The system can also be used to implement graduated licensing programs to ensure that only qualified young drivers are graduating from one level to another demonstrating actual driver behavior and driving experience while reducing fraud.

17 Claims, 3 Drawing Sheets

(56) References Cited

U.S. PATENT DOCUMENTS

| | | | |
|---|---|---|---|
| 2003/0155711 A1* | 8/2003 | Barry | A63F 3/00088 273/252 |
| 2008/0255722 A1* | 10/2008 | McClellan | B60R 25/102 701/31.4 |
| 2010/0143872 A1 | 6/2010 | Lankteee | |
| 2011/0307188 A1* | 12/2011 | Peng | G06Q 10/0639 702/33 |
| 2013/0006674 A1* | 1/2013 | Bowne | G06Q 10/0639 705/4 |
| 2013/0085818 A1 | 4/2013 | Gore et al. | |
| 2014/0051041 A1* | 2/2014 | Stefan | G09B 19/167 434/65 |

\* cited by examiner

BEHAVIOR BASED DRIVING RECORD MANAGEMENT AND REHABILITATION

BACKGROUND

A driver convicted of or found responsible for a driving-related offence may result in demerit points recorded on his/her record. These demerit points increase their auto insurance premiums, and the demerit points may stay on the driver's record for many years from the date of the offence. Unfortunately, this outcome introduces a substantial financial cost and penalty that may not accomplish the intended goal of safe driving and adherence to the appropriate driving rules and regulations.

Most demerit point systems impact the driver's auto insurance rate. At the time of vehicle insurance renewal, the auto insurer can review the driver's profile and adjust premiums based on their actuarial risks. Unfortunately, the link between demerit points and insurance risks is not always guaranteed. Some driving behaviors are simply anomalies or exceptions that may incur demerit points but may not be indicative of persistent poor driving behavior.

SUMMARY

The behavior-based driving record management program provided here is designed to assist drivers that have received driving penalties or "demerit points" to improve their behavior and "rehabilitate" to recover their driving privileges. Telematics are used to monitor the driving behavior over time and provide feedback to the driver.

The behavior based driving record management program is designed to assist drivers that have received driving penalties or "demerit points" to improve their behavior and "rehabilitate" to recover their driving privileges. This program helps not only the driver with a poor driving record, but also helps to protect others from drivers who abuse the privilege of driving. The behavior based driving record management program can be implemented at various stages of poor driving records, including starting from the date of a warning letter has been initiated (served), or when the driver has been ordered for an interview or license suspended, depending on the offence committed and on the relevant existing penalties in the given jurisdiction.

The system can also be used to implement graduated licensing programs to ensure that only qualified young drivers are graduating from one level to another demonstrating actual driver behavior and driving experience while reducing fraud.

The system can also be used with driving schools to monitor student driving and to prevent fraud in driving schools.

The system may provide coaching tips including context-relevant constructive messages generated according to the combined behavioral driving data. The system may provide driver alerts and notifications that are generated based on detection of undesirable driving behaviors from a customizable set of rules. The driver alerts and notifications may be delivered using one of more medium of choice including web portal with maps, Email, and SMS. Feedback may be delivered in the form of an "in-vehicle mentor", with a machine personality tailored for constructive coaching.

DETAILED DESCRIPTION

Figure 1:
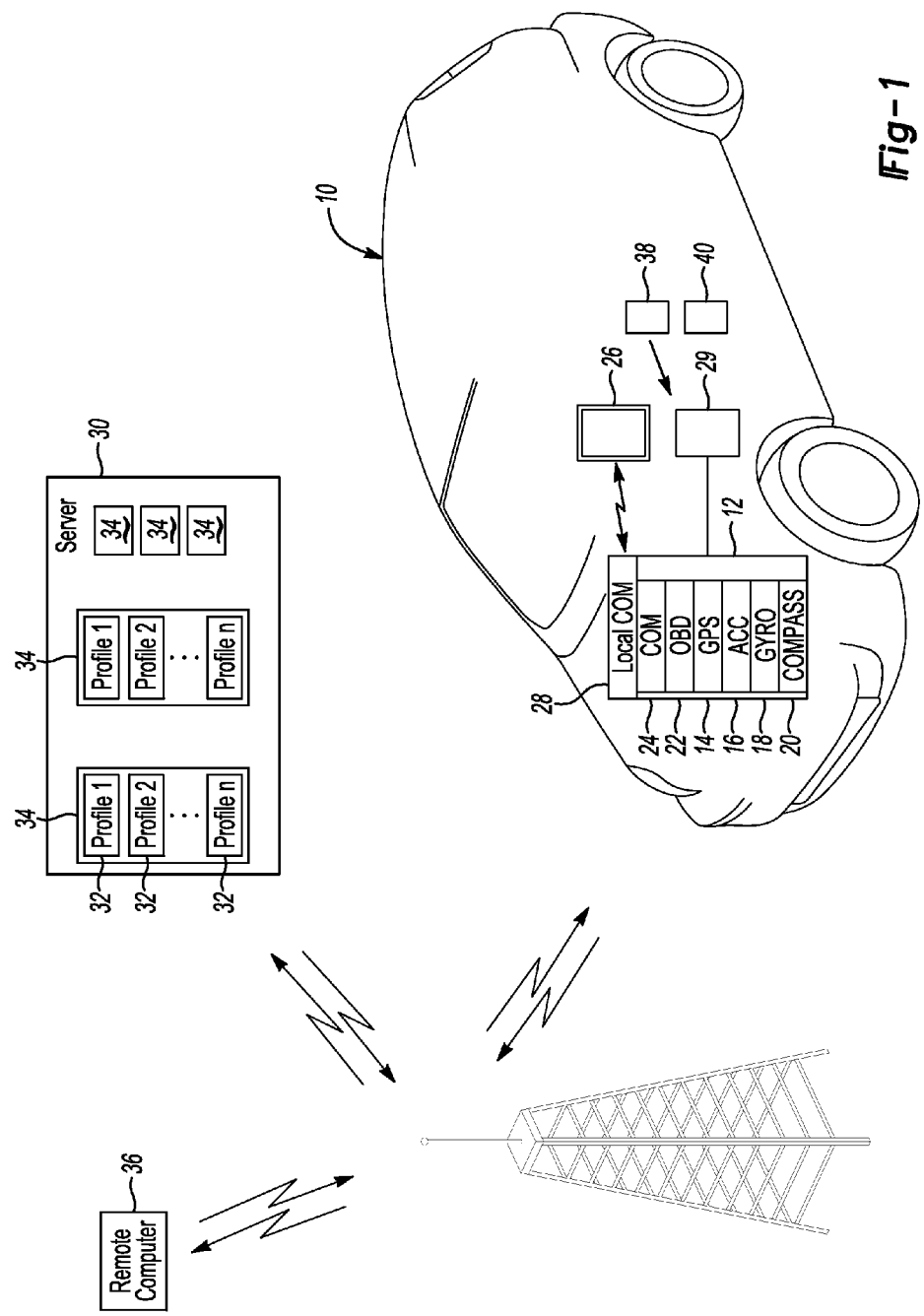
FIG. 1 is a schematic of hardware that can be used to implement the system and method of the present invention.

Referring to FIG. 1, a motor vehicle 10 includes a plurality of data gathering devices that communicate information to an appliance 12 installed within the vehicle 10. The example data gathering devices include a global positioning satellite (GPS) receiver 14, a three-axis accelerometer 16, a gyroscope 18 and an electronic compass 20, which could be housed within the appliance 12 (along with a processor and suitable electronic storage, etc., suitably programmed to perform the functions described herein). As appreciated, other data monitoring systems could be utilized within the contemplation of this invention. Data may also be collected from an onboard diagnostic port (OBD) 22 that provides data indicative of vehicle and vehicle engine operating parameters such as vehicle speed, engine speed, temperature, fuel consumption (or electricity consumption), engine idle time, car diagnostics and other information that is related to mechanical operation of the vehicle. Moreover, any other data that is available to the vehicle could also be communicated to the appliance 12 for gathering and compilation of the operation summaries of interest in categorizing the overall operation of the vehicle. Not all of the sensors mentioned here are necessary, however, as they are only listed as examples.

The appliance 12 may also include a communication module 24 (such as cell phone, satellite, wi-fi, etc.) that provides a connection to a wide-area network (such as the internet). Alternatively, the communication module 24 may connect to a wide-area network (such as the internet) via a user's cell phone 26 or other device providing communication via a local communication circuit 28 (e.g. Bluetooth). A card reader 29 is also in communication with the appliance 12 in the vehicle. The card reader 29 may be a barcode reader or magnetic stripe reader, nfc reader, etc or any kind of reader that could read information from a driver's license 38.

The in vehicle appliance 12 gathers data from the various sensors mounted within the vehicle 10 and stores that data. The in vehicle appliance 12 transmits this data (or summaries or analyses thereof) as a transmission signal through a wireless network to a server 30 (also having at least one processor and suitable electronic storage and suitably programmed to perform the functions described herein). The server 30 utilizes the received data to categorize vehicle operating conditions in order to determine or track vehicle use. This data can be utilized for tracking and determining driver behavior, insurance premiums for the motor vehicle, tracking data utilized to determine proper operation of the vehicle and other information that may provide value such as alerting a maintenance depot or service center when a specific vehicle is in need of such maintenance. Driving events and driver behavior are recorded by the server 30, such as fuel and/or electricity consumption, speed, driver behavior (acceleration, speed, etc.), distance driven and/or time spent in certain insurance-risk coded geographic areas. For example, the on-board appliance 12 may record the amount of time or distance in high-risk areas or low-risk areas, or high-risk vs. low risk roads. The on-board appliance 12 may collect and transmit to the server 30 (among other things mentioned herein): Speed, Acceleration, Distance, Fuel consumption, Engine Idle time, Car diagnostics, Location of vehicle, Engine emissions, etc.

The server 30 includes a plurality of profiles 32, each associated with a vehicle 10 (or alternatively, with a user). Among other things, the profiles 32 each contain information about the vehicle 10 (or user) including some or all of the gathered data (or summaries thereof). Some or all of the data (or summaries thereof) may be accessible to the user via a computer 32 over a wide area network (such as the internet) via a policyholder portal, such as fuel efficiency, environmental issues, location, maintenance, etc.

The user may be able to access some information in his profile 32, such as from a remote computer 36 (or the user's mobile device 26 via a browser or dedicated app) via a wide area network, such as the internet. The user can also customize some aspects of the profile 32.

It should be noted that the server 30 may be numerous physical and/or virtual servers at multiple locations. The server 30 may collect data from appliances 12 from many different vehicles 10 associated with a many different insurance companies and many different licensing organizations (e.g. government organizations responsible for licensing drivers). Each may configure parameters only for their own users, although information may be shared or replicated between an insurance company and a government organization. The server 30 permits the administrator of each insurance company to access only data for their policyholders. The server 30 permits the administrator of each licensing authority to access only data for their drivers. The server 30 permits each user to access only his own profile and receive information based upon only his own profile.

The server 30 may not only reside in traditional physical or virtual servers, but may also coexist with the on-board appliance, or may reside within a mobile device. In scenarios where the server 30 is distributed, all or a subset of relevant information may be synchronized between trusted nodes for the purposes of aggregate statistics, trends, and geo-spatial references (proximity to key locations, groups of drivers with similar driving routes).

Independent of the particular underlying hardware, events and driving behavior are derived and used to graduate and rehabilitate drivers as described below.

An ideal demerit point system should serve to provide drivers with accurate data on their driving behavior, and not as a pure punitive measure that does not offer the opportunity for driving improvement and enhanced safe driving skills. By deploying telematics, participants in a behavior based driving record management and rehabilitation program may be given a second chance, an opportunity to better their driving behavior and demonstrate driving skills that are consistent with safe driving under the relevant transportation rules and regulations. Over time, driving data generated through telematics serves as an electronic log book for drivers and instructors to learn and correct poor driving habits and a source of accurate information for auto Insurers to accurately assess driver risk.

Should a driver be required to participate in the rehabilitation program, an online interface is available, such as via remote computer 36 or mobile device 26, to seamlessly provision and deliver all necessary tools for the driver to self-install the appliance 12 and start receiving relevant feedback. Simple information includes shipping address, vehicle VIN for each of their authorized vehicles and their driver license details. The VIN is used to authenticate the vehicle 10 and validate authorized vehicles. The program is designed around in-vehicle telematics that tracks and generates an electronic log book of driver's behavior such as rapid acceleration, speeding, harsh braking, sharp turns, length of journey, type of road, and time of day. In cases where telematics is not available in the vehicle already, a self-install appliance 12 can be shipped to the driver's address (in an activated form), in turn, the driver will have a short time window to plug in the device into one of the designated vehicles 10. If the appliance 12 is not plugged in after the initial short time window, a report will be generated and an email or letter will be generated to remind the participant/user of the program to plug in the appliance 12 in order to start receiving benefits.

The rehabilitation program is designed around the individual driver (program participant) and not the vehicle 10 and as such, the program allows the driver to use any vehicle 10 that they designated at the time of registration in the program. In the event they need to use a new vehicle 10 such as in an emergency or a rental car, they can use a web-based application or dedicated mobile app on mobile device 26 to validate and add it to the list of designated vehicles. Furthermore, to ensure that the driving data/report is generated by and belongs to the registered participant only, the driver participating in the program will have to swipe his/her driver's license through the card reader 29 connected to the appliance 12 log book upon entering the vehicle 10 and turning the engine on each time. Alternatively, the driver can register his mobile device 26 on server 30 and can then be identified in the vehicle 10 by the appliance 12 detecting the presence of the driver's mobile device 26 via local communication 28.

As the driver generates driving data, the platform creates a unique driver identification signature based on their driving habits over time. This signature utilizes various habit forming parameters such as acceleration, speeding and unique timing parameters. If a specific demerit licensing re-education program policy includes a driver testing phase, the driver identification signature can be used to compare to the actual driving test as a means to dissuade drivers from trying to circumvent the program.

Figure 2:
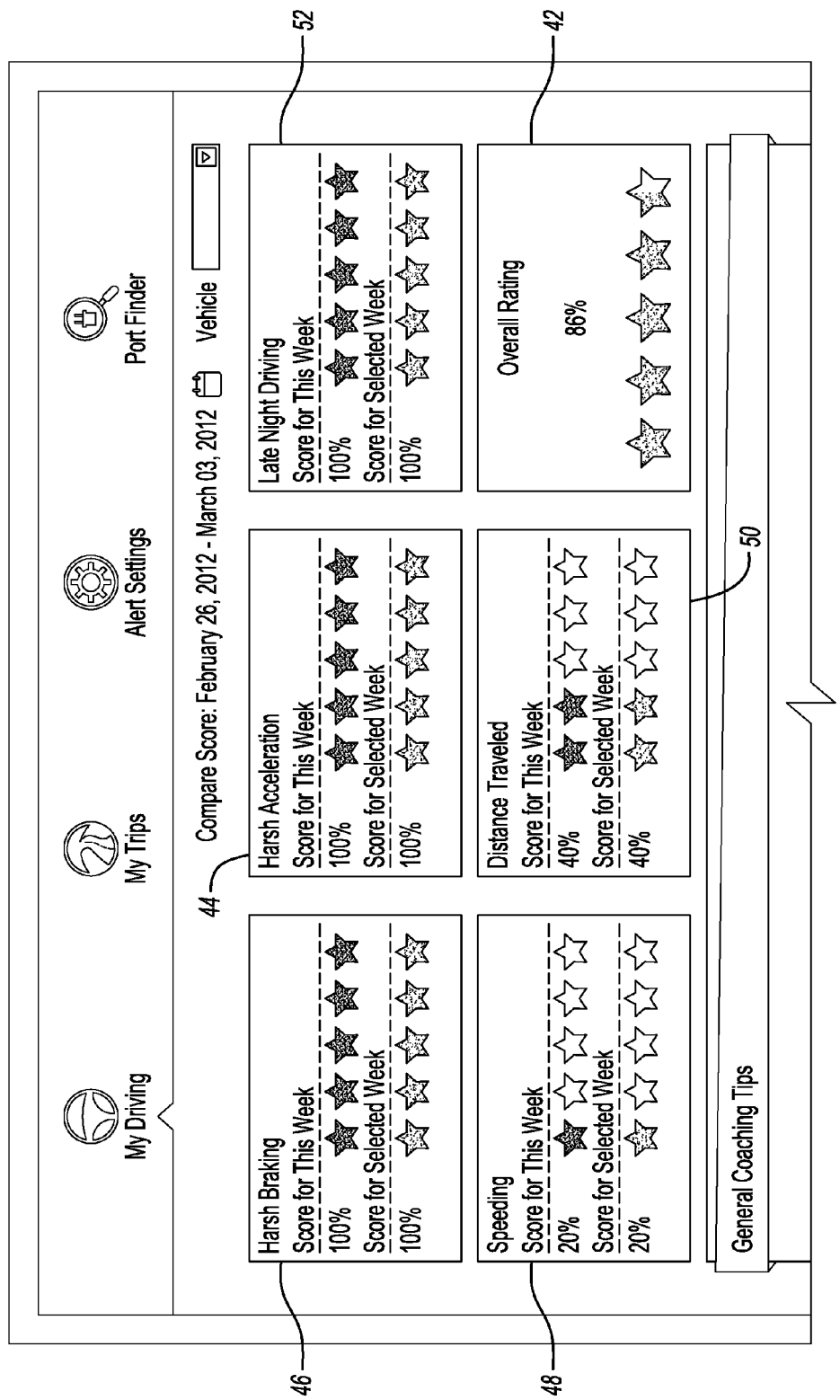
FIG. 2 is a sample user interface that could be used in connection with the system and method of FIG. 1.

The re-education may be performed based upon these six aspects: Behavior-Based Driving Score Summary; Electronic Log Book and Trip Summary; Enforcement; Coaching Tips; Driver Alerts and Notification; Seamless Integration with Auto Insurance Carriers Behavior-Based Driving Score Summary Referring to FIG. 2, drivers may be provided a behavior-based score 42 derived from behavioral driving metrics such as rapid acceleration 44, harsh braking 46, speeding 48, length of journey 50, time of day 52, type of road, etc.

Monitoring of driving behavior and scoring can be according to known methods.

Electronic Log Book and Trip Summary

The program generates an electronic log of all trips registered by the driver during his/her driver re-education (training) program. The log is stored in the user profile 32 on the server 30. At the conclusion of the program, the participant driver is provided with copy of the logs. These logs would be verified by the transportation authority at the time when the driver applies to graduate to the next level in the program.

Enforcement

At the registration of the program, the driver identifies all of the vehicle 10 VIN numbers that they will be driving during the duration of the program. Each time the driver begins a trip, he/she would swipe their driver's license 38 through the card reader 29 to register the beginning of the driving trip. If the appliance 12 is plugged in but the driver's license 38 is not swiped, it would be deemed ineligible towards the participant log book. In the event that the car 10 is pulled over by a law enforcement officer, the officer will be notified that the driver's license 38 belongs to a driver who is in the re-education program. A mobile and online application is available for the officer to validate that the appliance 12 is currently transmitting information (not disabled, etc). The same information is available to be integrated back into existing relevant transportation authority systems that furnish such information to computer equipped law enforcement vehicles.

Coaching Tips

Combining behavioral driving data, context, and a driver's behavior-based driving score, context-relevant constructive coaching feedback is provided to drivers based on their driving style.

Driving Alerts & Notifications

The program allows transportation authorities and drivers to set up alerts and notifications when an undesirable driving behavior is detected. These customizable alerts can be configured to be delivered using the most appropriate method including:

Web portal with maps
Email
SMS/Text Messaging
Benefits to Transportation and Licensing Authorities:
Objective, scientific and intelligent data of driving behavior
An opportunity for "demerited" drivers to self-examine their driving skills, hence improves driving habits, avoid committing driving infractions and improve highways safety.
Reduce overall accidents and better flow of traffic
Reduce fraud within Driver Education Programs
Benefits to Drivers:
Demonstrating good driving skills and behavior would remove demerits records sooner (e.g. in some places it is currently 2 years)
Providing Auto Insurers with intelligent driving data while assessing insurance premiums
A pre-driving suspension assessment data may prevent suspension of driving privilege
Improve driving skills by post analyzing trips and comparing actual driving scores to ideal driving scores
Objective evidence of good driving behavior, hold increase in insurance premiums based on demerits
Context relevant and constructive coaching and feedback to not be impacted by higher insurance premiums by removing demerits sooner
Graduated Licensing Program The system described above can also be used for a graduated licensing program. A Graduated Licensing program for young drivers (i.e. new or inexperienced drivers) helps motivate an on-going discussion and learning between Driver Training Programs, Young Drivers and Governments and helps promote and improve safe driving habits. The program generates electronic log book of driver behavior such as rapid acceleration, speeding, harsh braking, sharp turns, length of journey, type of road and time of day. Current licensing program in some areas are limited to a graduated time interval based program. The program could provide reduced time intervals between levels provided the driver is registered with an approved driver education program. With the use of the appliance 12 which is registered to a vehicle's 10 VIN number the program ensures that the young drivers are trained by an approved licensed trainer on an approved and insured vehicle 10. With the use of electronic log books, the program would ensure only qualified young drivers are graduating from one level to another by demonstrating actual driver behavior and driving experience whilst reducing fraud with the use of Near Field Communication (NFC) tags 40.

Additionally, the monitoring system can be used in conjunction with driving schools. First, the monitoring system can be used to monitor driving behavior of the trainee drivers in the driving school out on the road. Further, the pickup/dropoff locations of the trainee drivers can be monitored to reduce fraud in driving schools. When the tag 40 (or driver's license 38 or user's mobile device 26) is detected in the vehicle 10, the location of the vehicle 10 (as determined by appliance 12) can be compared to the location of the driving school to verify a valid beginning of a training drive. The path, including the distance and types of roads (e.g. highways or surface streets) is monitored by the appliance 12 during the training drive and associated with the trainee driver.

Behavior-Based Driving Score Summary

The participating young drivers are provided with a behavior based score derived from behavioral driving metrics such as:

Rapid Acceleration
Harsh Braking
Hard Cornering
High Speeds

The behavior score can be accessed in the user's profile 32 via the remote computer 36 or in an app in the mobile device 26.

Electronic Log Book and Trip Summary

Figure 3:
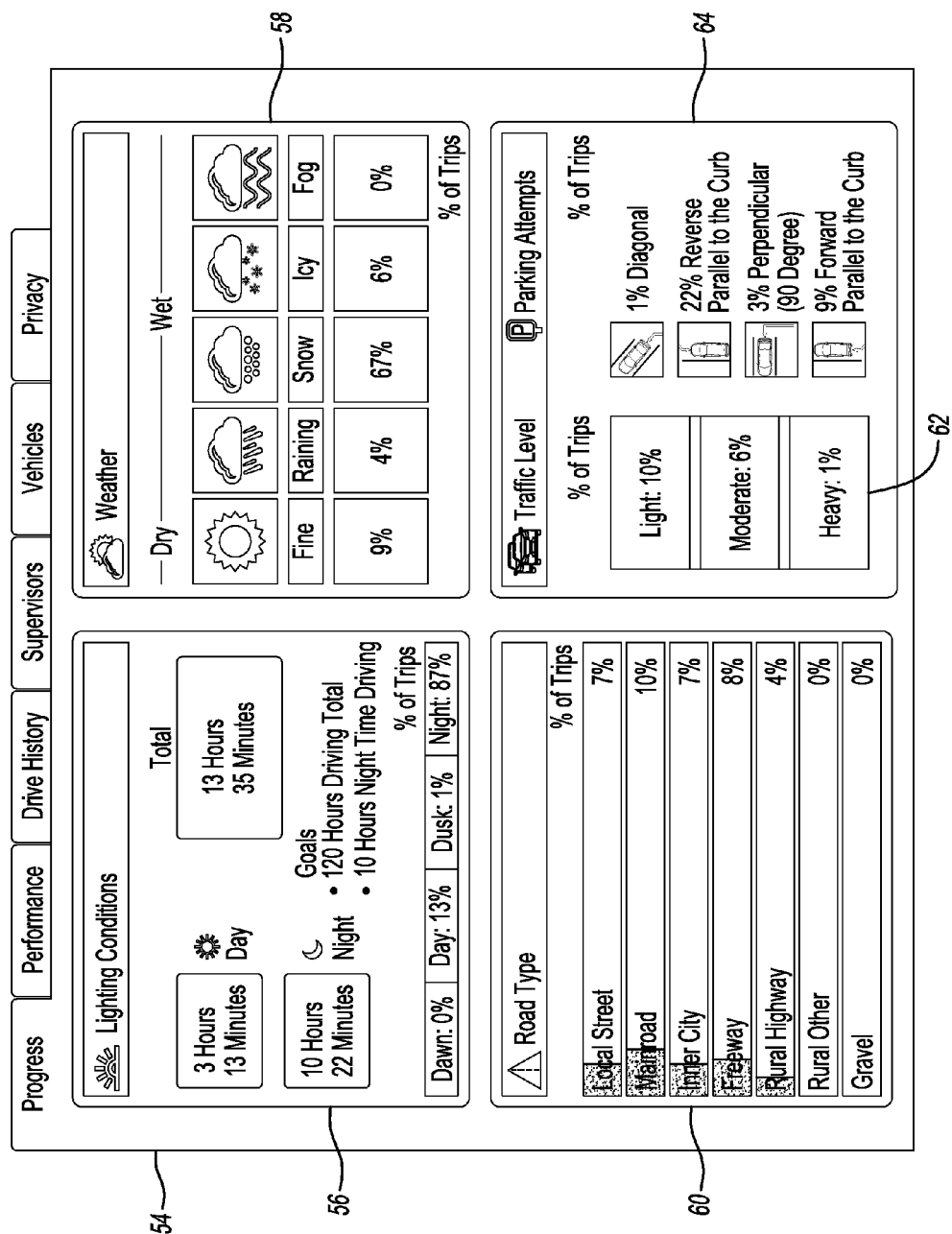
FIG. 3 is an example electronic logbook and summary that could be provided by the system and method of FIG. 1.

The program generates in the user's profile 32 an electronic log of all trips registered by the driver during their driver education program. At the conclusion of the program, the driver is provided a copy of the logs. These logs would be verified by the licensing authority at the time when the driver applies to graduate to the next level in the program. Referring to FIG. 3, an electronic log book and trip summary 54 may include analysis of lighting conditions 56 (time driving in daylight versus in night), analysis of weather conditions 58 (percent of trips in dry weather, rain, snow, ice and fog), analysis of road type 60 (percent of trips on local streets, main roads, inner city, freeway, rural highway, rural other, gravel), traffic level 62 (percent of trips in light, moderate or heavy traffic) and parking attempts 64 (percent of trips with diagonal parking, reverse parallel to the curb, perpendicular and forward parallel to the curb).

Reports include the following: Trip Summary, Length of Journey, Time of Day, Type of Road.

Reports can be requested by or automatically sent to the driver, the driver's parents, or the licensing authority.

Simple Driver Identification

The driver may identify himself by presenting his driver's license 38 to the reader 29 in the vehicle 10. Optionally, at the registration of the program, the driver is issued a simple NFC compliant RFID tag. Each time the driver begins or ends a trip, they simply place the tag near the reader 29 to identify themselves and reduce fraud. In the event the driver misplaces or loses their tag, a new one can be issued by the driving school and the user can call a full-service support team to help associate the new tag to their log records.

Benefits for the Government or Licensing Authority
Objective evidence of good driving behavior
Ensure qualified drivers are graduating
Reduce overall accidents
Reduce fraud within Driver Education Programs
Benefits for Driver Training Programs Opportunity to generate additional revenue by up-selling to the young drivers One appliance 12 per car 10 as compared to a device per driver Reduce fraud Improve driving skills by post analyzing trips and comparing actual driving scores to ideal driving scores In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A system for analyzing driving behavior of a driver comprising:
    at least one sensor in a vehicle for gathering driving behavior data;
    at least one computer recording the driving behavior data over time and generating a driving behavior summary based upon the driving behavior data over time; and
    a mobile device communicating with the at least one computer to inform a law enforcement officer that the driver is in a driving re-education program and whether the at least one computer is currently receiving information from the at least one sensor in the vehicle.

2. The system of claim 1 wherein the driving behavior data is applied to "rehabilitate" the driver after driving penalties or an accumulation of demerit points.

3. The system of claim 1 wherein the driving behavior summary includes a behavior-based driving score and trip summaries.

4. The system of claim 3 wherein the behavior-based driving score is derived from metrics including rapid acceleration, harsh braking, speeding, length of journey, time of day, and type of road.

5. The system of claim 1 wherein the driving behavior summary includes a trip summary generated from trips by the driver in the vehicle and in a second vehicle.

6. The system of claim 1 wherein the vehicle is a first vehicle, the system further including a second vehicle having at least one second sensor for gathering driving behavior data, wherein the at least one computer generates the driving behavior summary based upon the driving behavior data from the first vehicle and the driving behavior data from the second vehicle.

7. The system of claim 6 wherein at least one computer can receive a validation of a new vehicle to associate with the driver.

8. The system of claim 1 further including a reader for authenticating the driver before the vehicle begins each trip.

9. The system of claim 8 wherein the reader is configured to authenticate the driver based upon a driver's license.

10. The system of claim 1 wherein a driver identification signature is computed based on driving habits of the driver observed over time.

11. The system of claim 10 wherein the driving habits include, but are not restricted to, the driver acceleration, deceleration, and speeding patterns.

12. A system for analyzing driving behavior of a driver comprising:
    at least one sensor in a first vehicle for gathering driving behavior data;
    at least one sensor in a second vehicle for gathering driving behavior data; and
    at least one computer recording the driving behavior data over time and generating a driving behavior summary based upon the driving behavior data over time, wherein the driving behavior summary includes a trip summary generated from trips by the driver in the first vehicle and in the second vehicle.

13. The system of claim 12 wherein at least one computer can receive a validation of a new vehicle to associate with the driver.

14. The system of claim 12 further including a reader in each vehicle for identifying the driver in each vehicle, the at least one computer associating the driving behavior with the driver identified by the reader in each vehicle.

15. A system for analyzing driving behavior of a driver comprising:
    at least one sensor in a vehicle for gathering driving behavior data; and
    at least one computer recording the driving behavior data over time and generating a driving behavior summary based upon the driving behavior data over time, wherein the at least one computer implements a graduated licensing program that qualifies the driver from one level to the next based upon the driving behavior data over time.

16. The system of claim 15 further including a reader for identifying the driver in the vehicle.

17. The system of claim 15 wherein the at least one computer monitors pickup and dropoff locations of the driver to log training drives, and wherein the at least one computer monitors types of roads during the training drives associated with the driver.

* * * * *